F. SCHREIDT.
VALVE.
APPLICATION FILED MAY 26, 1913.
1,165,026.
Patented Dec. 21, 1915.
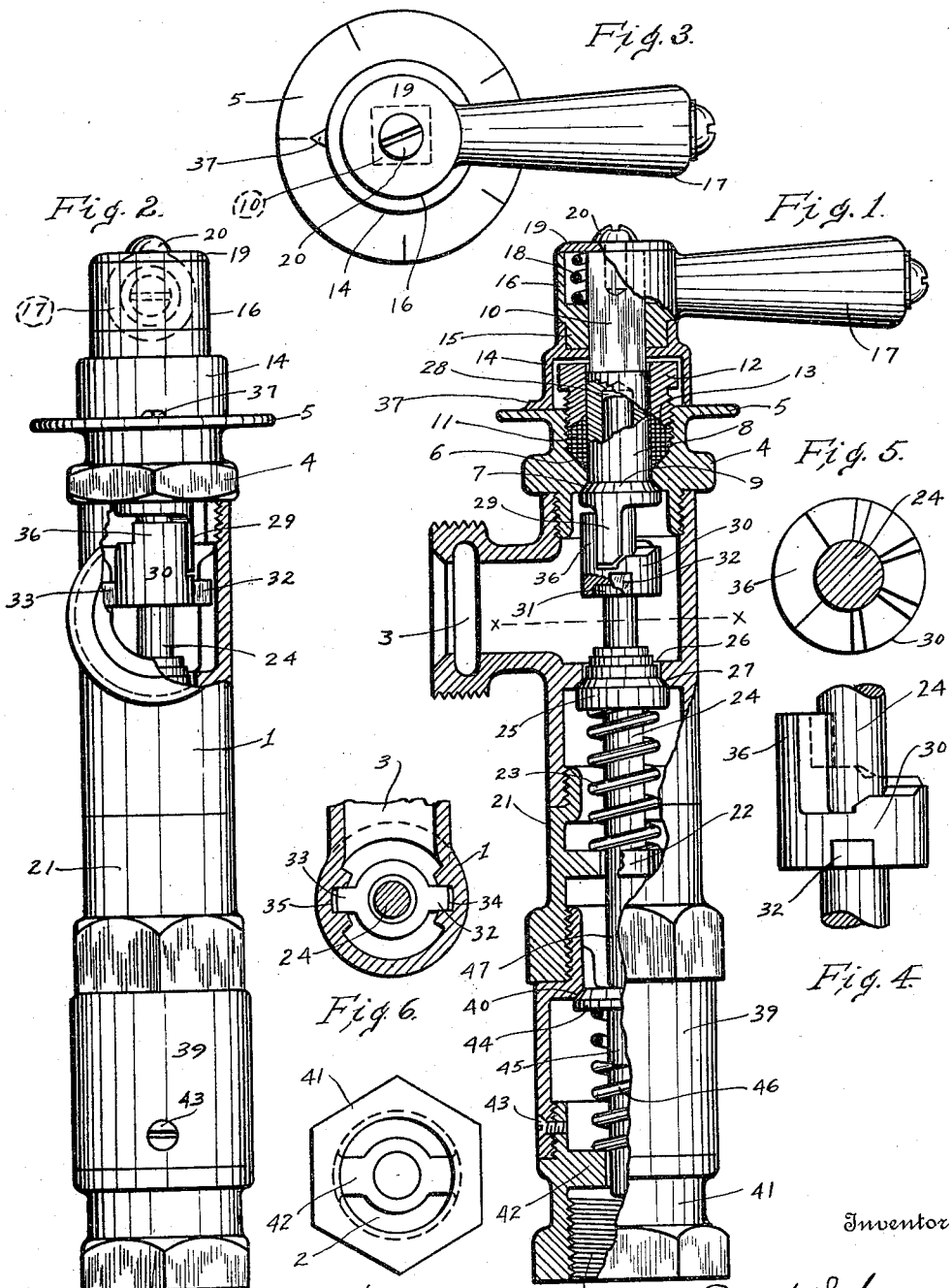

UNITED STATES PATENT OFFICE.

FRANK SCHREIDT, OF MANSFIELD, OHIO.

VALVE.

1,165,026.      Specification of Letters Patent.      Patented Dec. 21, 1915.

Application filed May 26, 1913. Serial No. 769,843.

*To all whom it may concern:*

Be it known that I, FRANK SCHREIDT, a citizen of the United States of America, residing at Mansfield, in the county of Richland and State of Ohio, have invented certain new and useful Improvements in Valves, of which the following is a specification.

My invention relates to valves and is especially adapted for use with radiators or the like.

The objects of my invention are to construct a valve by means of which hot water, steam or other vapor can be admitted to the radiator uniformly and gradually from the most minute opening until the valve is in full open position; to utilize and combine fluid pressure and spring tension in unison to normally keep the valve closed; to provide a stepped cone valve that will gradually close the area of the valve opening until it reaches closed position; said valve being operated by a cam which is mounted on one part of a two-part valve stem; to provide means of forming a ground joint on the one part of the valve stem; to provide means of indicating the area of the opening of the stepped cone valve; to provide means through the medium of a cam to open or close the stepped cone valve, quickly or slowly, within a certain distance of the travel of the operating handle; to provide means for keeping the valve open against high pressure; and to provide means for using an auxiliary valve which automatically closes the inlet and operates in conjunction with the main valve to permit of the main valve being disconnected for repairs or the like.

Having these and other objects in view, my invention is illustrated in the accompanying drawing, in which—

Figure 1 is a vertical sectional side elevation of the valve showing the auxiliary valve attached thereto and the cone stepped valve in closed position. Fig. 2 is a side elevation of the valve with a portion of the body broken away to show the opposite side of the stepped cam to that shown in Fig. 1. Fig. 3 is a plan view of the operating handle and dial. Fig. 4 is a side view of the cam showing a predetermined number of graduated steps of different sizes and a stop. Fig. 5 is a top view of Fig. 4. Fig. 6 is a cross sectional view of the cam on the line X—X of Fig. 1, showing projecting lugs provided thereon engaging the slots formed in the body of the valve. Fig. 7 is an end view showing the bridge piece arranged to support the spring for the auxiliary valve.

In the drawings, reference numeral 1 indicates the body of the valve, 2 the inlet and 3 the outlet. A cap 4 having a dial 5 is threadably connected to the body and counterbored to provide beveled seats 6 and 7 in the inner periphery. The part 8 of a valve stem is rotatably mounted in the inner periphery of the cap and is provided with a collar 9 which is adapted to contact with the seat 7. The upper portion 10 of the part 8 of the valve stem is square or of an angular shape. Packing 11 is inserted in the inner screw-threaded periphery of the cap and contacts with the seat 6 and a gland nut 12 engages the inner periphery of the cap and when screwed down, with the packing 11 or the like interposed between the seat 6 and the beveled portion 13 of the gland nut, prevents leakage past the part 8 of the stem aided by the seat 7 and collar 9.

A cupped shape member 14 has a squared aperture in its central portion to fit the squared part 10 of the part 8 of the stem and is arranged to rest and move upon the surface of the dial 5. The member 14 is counterbored to receive the reduced shouldered portion 15 of the head 16 of an operating handle 17 which head is provided with a squared aperture to fit the part 10 of the part 8 of the stem. The head 16 of the operating handle is cupped to receive a coil spring 18 which surrounds the part 10 of the stem 8. The spring 18 is inclosed in the cupped portion of the head by a washer 19 and fastened therein under compression by a screw 20 or other equivalent fastening means. The spring 18 normally presses against the washer 19 and forces the collar 9 into close contact with the seat 7 thereby automatically taking up the wear of the parts. A nipple 21 is connected to the valve body 1 and carries a bridge piece 22 upon which is mounted a coil spring 23. A complemental part 24 of the part 8 of the valve stem has secured thereon a stepped cone valve 25 which is arranged to gradually close the opening 26 and finally contact with the seat 27 under the tension of the spring 23 and fluid pressure derived from any source of supply. One end of part 24 of the stem enters an aperture 28 formed in the part 8 of the stem and telescopes therewith and the opposite end depends below the bridge piece for a purpose which will be described hereinafter.

The part 8 of the stem is provided with a projecting finger 29. A cam 30 is fitted to the part 24 of the stem and rests upon the collar 31, the lower face of the cam being counter-bored to receive said collar. Lugs 32 and 33 are provided on the cam and slidably engage the ways or slots 34 and 35 to prevent the cam from rotating when a sliding movement is imparted to it, as will be described hereinafter.

When the operating handle 17 is rotated in one direction, the finger 29 contacts with the face of the cam 30 and forces the valve 27 from its seat carrying with it the steps of the cone and thereby gradually and uniformly increasing the area of the valve opening 26, until the finger 29 contacts with one side of the stop 36 and prevents further rotation thereof. A pointer 37 is provided on the member 14 which can be set to indicate the area of the valve opening in conjunction with the dial.

It will be noted that spring tension and fluid pressure are both utilized in combination and in unison to normally hold the valve closed. In order to provide means to shut off the pressure or passage of any fluid through the supply pipe or the like, an auxiliary valve is provided and constructed to operate in conjunction with the radiator or main valve 25 and comprises the following instrumentalities: A body 39 is threadably connected to the nipple 21 and is provided with a valve seat 40. A nipple 41 is connected to the body 39 and carries a bridge piece 42 and is held in place by the lock screw 43. A valve 44 carrying a stem 45 is mounted within the body and adapted to contact with the seat 40 and is normally held in close contact with the seat by a spring 46 which is interposed between the rear face of the valve and the bridge piece.

The valve 44 is forced from its seat by the end 47 of the part 24 of the valve stem when a sliding movement is imparted to said part of the stem by rotation of the operating handle and contact of the finger 29 with the face of the cam. When the operating handle is rotated in the opposite direction to permit the main valve to close, the valve 44 is automatically forced to close thereby cutting off the supply of fluid.

What I claim is:

1. In a valve, a main body having a valve seat, a nipple connected to the lower end of the body and having a bridge, a valve provided with a stepped cone engageable in said seat having a stem which extends through the bridge, a coil spring surrounding the stem and engaged with the valve and bridge, an auxiliary body having a valve seat connected to the nipple, a second nipple secured to the auxiliary body and having a bridge, a second valve engageable with the valve seat of the auxiliary body and having a stem passing through the bridge of the second nipple, a coil spring surrounding the second valve stem and engaged with the second valve and the bridge of the second nipple, a cap on the top end of the main body having an opening therethrough and a seat surrounding said opening, a stem extending through said opening, having a collar engageable on the last named seat and having a depending finger, a cam on the stem of the first named valve having a vertical stop to engage the finger when rotated in one direction, and means to prevent rotation of the first named valve.

2. In a valve, a body having a pair of spaced apart seats, a spring pressed slidable valve for one seat provided with a stepped cone and having a stem, means to hold said valve against rotating movement, a cam on the valve, a closure member in the other seat, means to rotatably support the closure member and to hold same against sliding movement, a finger on the closure member which rides upon the cam and depresses the same upon turning of the closure member, and a stop on the cam to engage the finger.

3. In a valve, a body, having a valve seat, a valve for said seat, a hollow cap on the body having an annular seat and having a peripheral dial, a closure member in the seat of the cap having a stem, packing surrounding said stem, a gland engaged with the packing and cap and extending above the cap, a cup-shaped member surrounding and inclosing the upper end of the gland and having its free edge seated on the dial, said member being counterbored on its top part, a handle having a head the lower part of which is received in said counterbored part and the top of which is recessed, said stem being connected to the member and head to rotate therewith, and a spring in the recess of the handle head to hold the said closure member against its seat.

4. In a valve, a body having two valve seats, and an annular seat, a three-part stem, two parts of said stem having valves thereon engageable with the respective valve seats, one of said valves carrying a stepped cone, a collar on the remaining stem part for engaging the annular seat, springs on each stem part for holding the valves and the collar to their respective seats, cam means between two of the stem parts to actuate one from the other, and means to manually operate one of said last named stem parts whereby the other of said last named stem parts will actuate the third stem part.

In testimony whereof I affix my signature in presence of two witnesses.

FRANK SCHREIDT.

Witnesses:
LELA RITCHIE,
JOHN H. BOSS.

Copies of this patent may be obtained for five cents each, by addressing the "Commissioner of Patents, Washington, D. C."